United States Patent
Ramaswamy

(12) 
(10) Patent No.: US 6,423,892 B1
(45) Date of Patent: Jul. 23, 2002

(54) METHOD, WIRELESS MP3 PLAYER AND SYSTEM FOR DOWNLOADING MP3 FILES FROM THE INTERNET

(75) Inventor: Muralidharan Ramaswamy, Danbury, CT (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/772,483

(22) Filed: Jan. 29, 2001

(51) Int. Cl.$^7$ .............................. G09B 5/00; G10H 1/26
(52) U.S. Cl. ..................... 84/609; 84/477 R; 434/307 A
(58) Field of Search ................... 84/609–614, 634–638, 84/477 R, 478; 434/307 A

(56) References Cited

U.S. PATENT DOCUMENTS

| | | | |
|---|---|---|---|
| 5,947,746 A | * | 9/1999 | Tsai .......................... 84/609 X |
| 5,969,283 A | * | 10/1999 | Looney et al. ................. 84/609 |
| 6,225,546 B1 | * | 5/2001 | Kraft et al. .................... 84/609 |
| 6,248,946 B1 | * | 6/2001 | Dwek ........................... 84/609 |
| 6,278,048 B1 | * | 8/2001 | Lee .............................. 84/610 |

* cited by examiner

Primary Examiner—Stanley J. Witkowski
(74) Attorney, Agent, or Firm—Gregory L. Thorne

(57) ABSTRACT

A method, wireless MP3 player and system for downloading MP3 files from MP3 content sites that are in data communication with the Internet. The method comprises the steps of providing a wireless application protocol network in data communication with the Internet, a music server in data connection with the Internet, at least one MP3 content site in data communication with the Internet, and a wireless MP3 player having circuitry for establishing data communications with the wireless application protocol network and a display for displaying information generated by the music server. The method further comprises the steps of operating the wireless MP3 player to establish data communication with the wireless application protocol network so as to establish data communication between the wireless MP3 player and the Internet, establishing data communication between the wireless MP3 player and the music server, inputting data into the wireless MP3 player that defines particular music desired by a user, operating the wireless MP3 player so as to instruct the music server to effect a search of the MP3 content sites to locate MP3 files relating to the desired music, displaying on the wireless MP3 player at least one title of an MP3 file located in the search, operating the wireless MP3 player to select the title, operating the wireless MP3 player to instruct the music server to upload an MP3 file that corresponds to the selected title, and downloading the uploaded MP3 file to the wireless MP3 player.

15 Claims, 2 Drawing Sheets

METHOD, WIRELESS MP3 PLAYER AND SYSTEM FOR DOWNLOADING MP3 FILES FROM THE INTERNET

BACKGROUND OF THE INVENTION

1. Field of the Invention

The present invention generally relates to a wireless MP3 player.

2. Description of Related Art

MP3 (MPEG Audio Layer-3) format is a compression system for digital music that helps reduce the size of a digitized song without degrading the sound quality. Digital music is converted to MP3 format and made available on the World Wide Web for individual use. MP3 files can be downloaded from the Internet using a computer and special software. Furthermore, a personal computer programmed with the appropriate software can covert digital music from a CD (compact disk) into MP3 format. Currently, MP3 files can be played in three different ways: (i) MP3 files can be played directly on a personal computer, (ii) MP3 files can be decompressed and recorded it onto a CD, and (iii) the MP3 files can be played on an MP3 player. MP3 players are relatively small, lightweight, portable devices that can interface with a personal computer. Thus, a user can download MP3 files from the Internet and load such MP3 files onto the MP3 player. Typically, the MP3 player can be connected to the personal computer's parallel or USB port in order to receive the downloaded MP3 files.

SUMMARY OF THE INVENTION

The present invention is directed to a method, a wireless MP3 player, and a system for locating MP3 files of interest on the Internet and downloading such files. The wireless MP3 player is used in conjunction with a wireless application protocol (WAP) network. The wireless MP3 player allows the user to enter certain keywords to denote the desired type of MP3 music. The wireless MP3 player establishes a direct connection to a dedicated music server. The keywords are inputted into the music server. A plurality of MP3 content sites are in data communication with the Internet and thus, accessible to the music server. The music server searches the Internet, and thus the MP3 content sites, for MP3 files that relate to the keywords. The music server generates a table comprising a list of titles of MP3 files and corresponding world wide web links wherein such MP3 files can be located. The music Internet server generates a user identification and then sends the table and user identification to the wireless MP3 player. The wireless MP3 player contains a display which displays the table. The user then uses the appropriate function keys of the wireless MP3 player to browse the table and select a title or titles of MP3 files of interest. The user then uses the appropriate function keys of the wireless MP3 player to instruct the music server to download the MP3 file associated with the selected title. The music server then downloads the selected MP3 file. Once the MP3 file is completely downloaded to the music server, the music server uploads the MP3 file to the Internet for retrieval by the wireless MP3 player. The wireless MP3 player waits for the MP3 files to be downloaded. The downloaded MP3 files are stored in a buffer read/write memory of the wireless MP3 player. When each MP3 file is completely loaded, the wireless MP3 player marks each MP3 file with indicia indicating that the particular MP3 has been completely loaded is ready to be played. The wireless MP3 player includes "Play" and "Stop Play" function keys. When the user depresses the "Play" key, the completely loaded MP3 files will play in the order in which they were loaded unless the user selects MP3 files out of order. Depressing the "Stop Play" key stops play of the MP3 file currently being played, but does not stop the further download of MP3 files. The user can also delete previously loaded MP3 files so as to clear memory space in order to download play new MP3 files.

BRIEF DESCRIPTION OF THE DRAWINGS

The features of the invention are believed to be novel and the elements characteristic of the invention are set forth with particularity in the appended claims. The invention itself, both as to organization and method of operation, may best be understood by reference to the detailed description which follows taken in conjunction with the accompanying drawings in which:

DETAILED DESCRIPTION OF THE INVENTION

Figure 1:
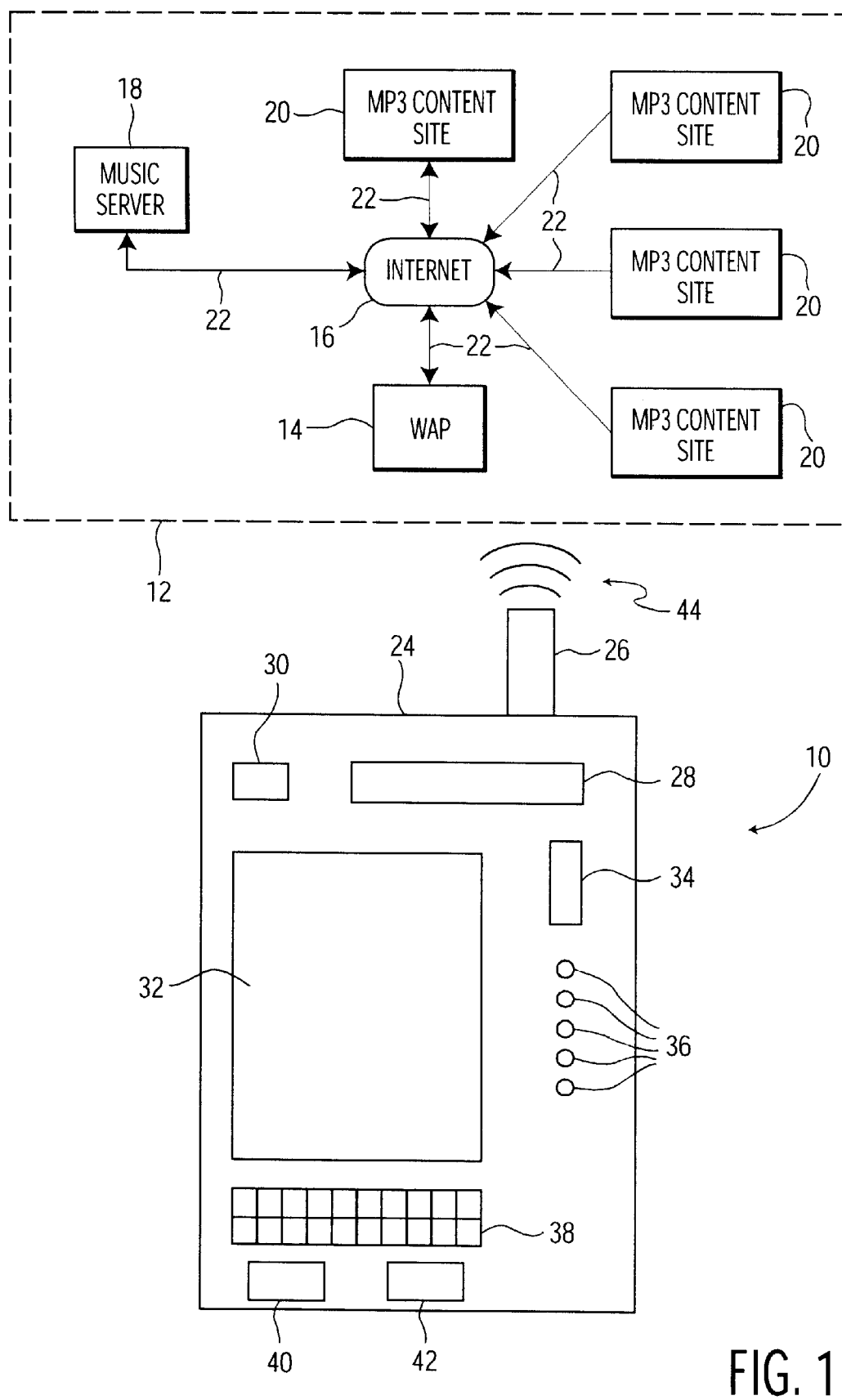
FIG. 1 shows a pictorial diagram of the wireless MP3 player of the present invention and a block diagram of a network with which the wireless MP3 player is used.

Referring to FIG. 1, there is shown wireless MP3 player 10 of the present invention. Player 10 is configured in accordance with a combination of technologies used in the field of cellular phones, hand held radio frequency communication devices, personal digital assistants, and portable audio devices such as portable compact disk players. The configuration of MP3 player 10 is discussed in the ensuing description. In accordance with the present invention, player 10 is used in conjunction with network 12. Network 12 comprises WAP (wireless application protocol) network 14, Internet network 16, music server 18 and MP3 content sites 20. WAP network 14 is in electronic data communication with Internet network 16 via data communication link 22. Music server 18 is in electronic data communication with Internet network 16 via data communication link 22. Similarly, MP3 content sites 20 are is in electronic data communication with Internet network 16 and dedicated music server 18 via data communication link 22. In one embodiment, data communication link 22 is configured as a telephone line.

Referring to FIG. 1, player 10 generally comprises housing 24, antenna 26, display 28, connect/disconnect function key 30, display 32, browse/select wheel or knob 34, function keys 36, keypad 38, "Play" function key 40, and "Stop Play" function key 42. Connect/disconnect function key 30 allows the user to establish or terminate data communication with WAP network 14. The user can use keypad 38 to input data which will appear in display 28. Display 32 displays information relating to titles or names of songs, musical compositions, types of music, e.g. jazz, classical, Hindustini, etc. The user uses browse/select wheel or knob 34 to select one or more titles shown in display 32. Function keys 36 provide several functions such as volume, bass, treble, DNR (Dolby™ Noise Rejection), etc. The user depresses function keys 40 and 42 to start and stop, respectively, play of music. Player 10 includes audio output devices (not shown) such as a speaker or head phone connector. Player 10 further includes a read/write buffer memory (not shown) for storing downloaded MP3 files.

Figure 2:
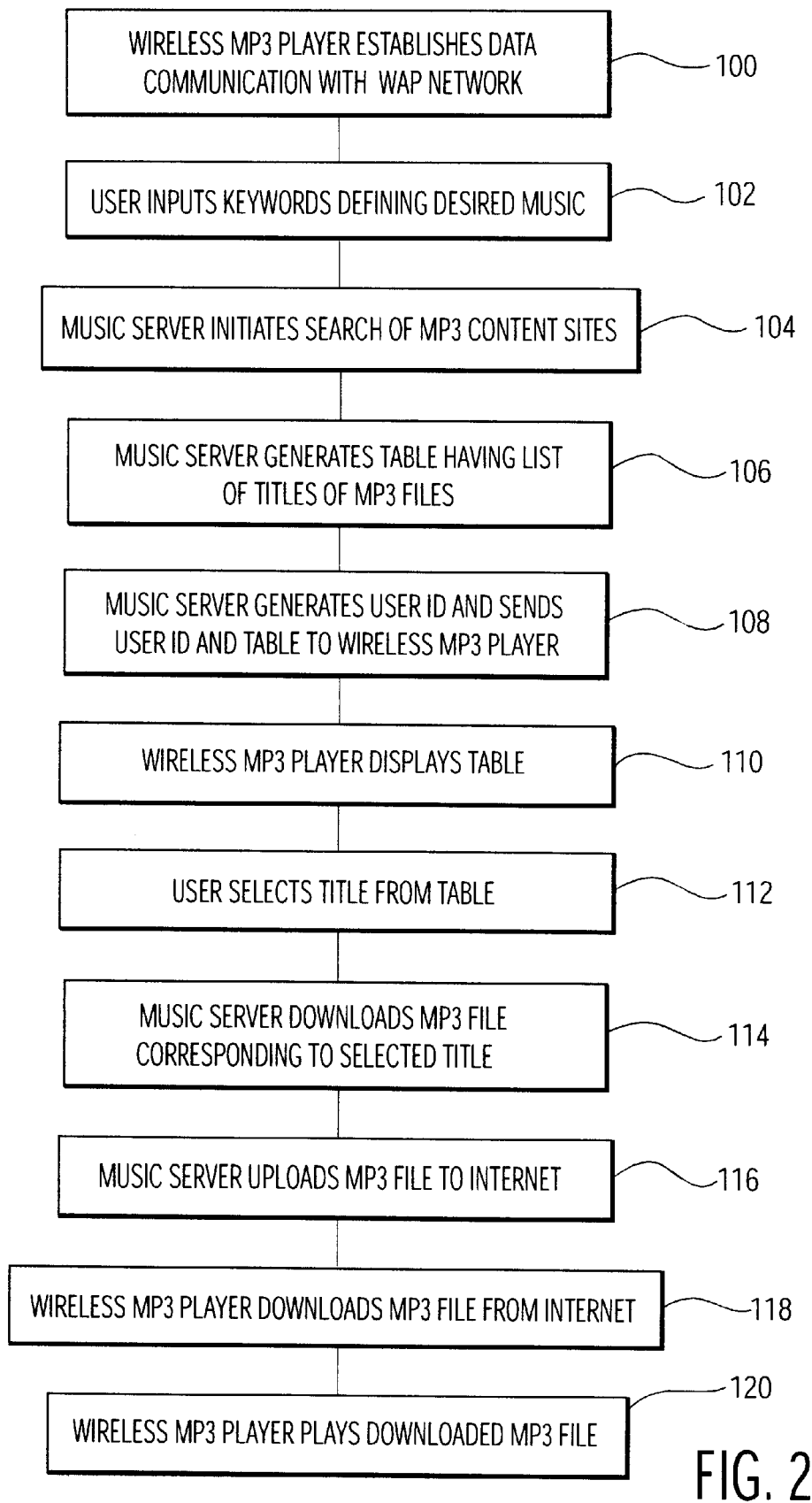
FIG. 2 is a flow diagrams illustrating the method of the present invention.

Each step of the method of the present invention is explained in the ensuing description with reference to FIGS. 1 and 2.

In step 100, the user operates player 10 to transmit signal 44 to WAP network 14 so as to establish data communication between player 10 and Internet network 16. In order to establish such data communication, the user uses connect/disconnect key 30 on player 10. Once this is accomplished, data communication can be established between player 10 and music server 18.

In step 102, the user then inputs information into player 10 via keypad 38. This information generally comprises a keyword or keywords that describes a particular song, type of music, particular artist or performer, etc. For example, the user can input the key word "Beethoven". Other examples of keywords are "jazz", "classical", and "Hindustini". The user then depresses an appropriate one of the function keys 36 so as to instruct music server 18 to initiate a search of the MP3 content sites 20 to locate MP3 files that relate to the keyword. As the user inputs the keywords, the keywords appear in display 28.

In step 104, music server 18 responds to the keywords by initiating a search of the MP3 content sites 20 to locate MP3 files that relate to the keyword or keywords.

In step 106, music server 18 generates: (i) a list of titles of MP3 files that were located in the search, (ii) a list of corresponding world-wide-web links wherein each link corresponds to a particular MP3 file, and (iii) corresponding index indicia wherein each indicia corresponds to a particular title and link. Music server 18 then generates a table comprising the list of titles of MP3 files that were located in the search and the corresponding index indicia.

In step 108, music server 18 generates a user identification and transmits the user identification and table to wireless MP3 player 10.

In step 110, wireless MP3 player 10 receives signals containing data that defines the user identification and table. The table appears in display 32 of player 10. The user uses wheel or knob 34 to browse the table. Table I illustrates one example of a table generated by music server 18.

TABLE I

| TITLE OF MP3 FILE | INDEX INDICIA |
|---|---|
| Louis Armstong's Hits | #1 |
| Beethoven's 9$^{th}$ Symphony | #2 |
| Hindustini Favorites | #3 |

In step 112, the user then uses wheel or knob 34 or one of function keys 36 to effect the selection of an index indicia that corresponds to the desired music title. In response, player 10 transmits the user identification and the index indicia of the selected music title. Data defining the user identification is also transmitted along with data defining the selected index indicia.

In step 114, WAP network 14 receives the data transmitted from player 10 and routes the data to Internet network 16 wherein it is received by music server 18. In response, music server 18 stores the selected index indicia and downloads an MP3 file that corresponds to the selected index indicia using their corresponding web links. Specifically, music server 18 downloads the MP3 file from one of the MP3 content sites 20 that is storing the MP3 file.

In step 116, music server 18 uploads the MP3 file to Internet network 16. Music server 18 generates a signal for input into player 10 to notify the user that an MP3 file has been retrieved and is ready for downloading. In one embodiment, a message appears in display 32 that informs the user that an MP3 file has been uploaded to the Internet network 16 and is ready for downloading.

In step 118, once player 10 receives the signal generated in step 116, player 10 automatically switches to the download mode and downloads the MP3 files. While the MP3 file is being downloaded, player 10 is constantly monitoring the capacity of the buffer memory in player 10. If the buffer memory should become full, player 10 generates and transmits a signal to music server 20 in order to stop music server 18 from downloading the MP3 file or files. As space becomes available in the buffer memory, player 10 automatically transmits a signal to music server 18 to resume downloading the MP3 files.

In step 120, when at least one MP3 file is completely downloaded, player 10 indicates that it is ready to play the music in that MP3 file by displaying a message in display 32. The user then presses "Play" key 40 to play the music of the completely loaded MP3 file. In an alternate embodiment, player 10 includes a "Ready To Play" light that notifies the user that player 10 is ready to play the music in the completely downloaded MP3 file. Next, the user then selects the listening mode, e.g. speaker or head phones. The user then depresses "Play" key 40 and player 10 plays the selected title.

The user can repeat the steps described in the foregoing description as many times as needed to in order to download and play different MP3 files.

An important feature of player 10 is that player 10, and the user, need not wait for all the MP3 files to be downloaded. Player 10 is configured to start playing the first completely downloaded MP3 file while simultaneously downloading other MP3 files. This feature provides continuous play of music without interruption.

In one embodiment, the user can operate player 10 to request that music server 18 store the titles of all of the user's downloaded MP3 files and corresponding links for these titles. In such a configuration, music server 18 generates a list of the titles of downloaded MP3 files in the event that the user would like to hear a particular musical title again. This configuration enables music server 18 to immediately establish a link with the MP3 content site 20 that has that particular MP3 file without having to conduct another search of all MP3 content sites 20.

The principals, preferred embodiments and modes of operation of the present invention have been described in the foregoing specification. The invention which is intended to be protected herein should not, however, be construed as limited to the particular forms disclosed, as these are to be regarded as illustrative rather than restrictive. Variations in changes may be made by those skilled in the art without departing from the spirit of the invention. Accordingly, the foregoing detailed description should be considered exemplary in nature and not limited to the scope and spirit of the invention as set forth in the attached claims.

Thus, having described the invention, what is claimed is:

1. A method for downloading MP3 files from MP3 content sites that are in data communication with the Internet, the method comprising the steps of:

providing a wireless application protocol network in data communication with the Internet, a music server in data connection with the Internet, at least one MP3 content site in data communication with the Internet, and a wireless MP3 player having circuitry for establishing data communications with the wireless application protocol network and a display for displaying information generated by the music server;

operating the wireless MP$^3$ player to establish data communication with the wireless application protocol network so as to establish data communication between the wireless MP3 player and the Internet;

establishing data communication between the wireless MP3 player and the music server;

inputting data into the wireless MP3 player that defines particular music desired by a user;

operating the wireless MP3 player so as to instruct the music server to effect a search of the MP3 content sites to locate MP3 files relating to the desired music;

displaying on the wireless MP3 player at least one title of an MP3 file located in the search;

operating the wireless MP3 player to select the title;

operating the wireless MP3 player to instruct the music server to upload an MP3 file that corresponds to the selected title; and downloading the uploaded MP3 file to the wireless MP3 player.

2. The method according to claim 1 wherein the displaying step comprises the steps of:

generating a table comprising at least one title, a corresponding link and a corresponding index indicia; and displaying the table on the display of the wireless MP3 player.

3. The method according to claim 2 further comprising the steps of:

browsing the table; and selecting a title by inputting data into the wireless MP3 player that defines the index indicia of the selected title.

4. The method according to claim 2 wherein the generating steps further includes the step of generating a user identification and transmitting user identification to the wireless MP3 player.

5. The method according to claim 1 wherein the downloading step comprises the step of generating a signal for input into the wireless MP3 player that notifies the user that the MP3 file is ready to be downloaded from the Internet.

6. The method according to claim 1 further comprising the step of playing the MP3 file.

7. A system for downloading MP3 files from at least one MP3 content site that is in data communication with the Internet, comprising:

a wireless application protocol network in data communication with the Internet;

a music server in data connection with the Internet;

at least one MP3 content site in data communication with the Internet; and a wireless MP3 player comprising circuitry for establishing data communication with the wireless application protocol network, means for inputting data that defines desired music, means for instructing the music server to effect a search of the MP3 content site to locate MP3 files relating to the desired music, a display for displaying at least one title of an MP3 file located in the search, means for selecting a title, means for instructing the music server to upload an MP3 file that corresponds to the selected title, means for downloading the uploaded MP3 file to the wireless MP3 player, and means for playing the downloaded MP3 file.

8. The system according to claim 7 wherein the wireless MP3 player further comprises an audio output device.

9. The system according to claim 7 wherein the wireless MP3 player further comprises a buffer memory for storing downloaded MP3 files.

10. The system according to claim 9 wherein the wireless MP3 player further comprises means for generating a data signal for input into the music server that indicates the capacity of the buffer memory.

11. A wireless MP3 player for effecting wireless data communication with a wireless application protocol network that is in data communication with the Internet and a dedicated music server that is in data communication with the Internet, the wireless MP3 player comprising circuitry for establishing data communication with the wireless application protocol network, means for inputting data that defines desired music, means for instructing the music server to effect a search of MP3 content Internet sites to locate MP3 files relating to the desired music, a display for displaying at least one title of an MP3 file located in the search, means for selecting a title, means for instructing the music server to upload an MP3 file that corresponds to the selected title, means for downloading the uploaded MP3 file to the wireless MP3 player, and means for playing the downloaded MP3 file.

12. The wireless MP3 player according to claim 11 wherein the wireless MP3 player further comprises an audio output device.

13. The wireless MP3 player according to claim 11 wherein the wireless MP3 player further comprises a buffer memory for storing downloaded MP3 files.

14. The wireless MP3 player according to claim 11 wherein the wireless MP3 player further comprises means for generating a data signal for input into the music server that indicates the capacity of the buffer memory.

15. The wireless MP3 player according to claim 11 further comprising an additional display for displaying data inputted by a user.

\* \* \* \* \*